United States Patent
Jacobs et al.

(10) Patent No.: US 8,327,083 B2
(45) Date of Patent: *Dec. 4, 2012

(54) TRANSPARENT HYPERVISOR PINNING OF CRITICAL MEMORY AREAS IN A SHARED MEMORY PARTITION DATA PROCESSING SYSTEM

(75) Inventors: Stuart Z. Jacobs, Lakeville, MN (US); David A. Larson, Rochester, MN (US); Naresh Nayar, Rochester, MN (US); Wade B. Ouren, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/344,708

(22) Filed: Jan. 6, 2012

(65) Prior Publication Data

US 2012/0110273 A1    May 3, 2012

Related U.S. Application Data

(63) Continuation of application No. 12/403,447, filed on Mar. 13, 2009, now Pat. No. 8,127,086.

(60) Provisional application No. 61/059,492, filed on Jun. 6, 2008.

(51) Int. Cl.
G06F 12/00 (2006.01)
(52) U.S. Cl. ........................... 711/147; 711/152
(58) Field of Classification Search .................. None
See application file for complete search history.

(56) References Cited

U.S. PATENT DOCUMENTS

| | | | |
|---|---|---|---|
| 5,909,540 A | 6/1999 | Carter et al. |
| RE36,462 E | 12/1999 | Chang et al. |
| 6,725,284 B2 | 4/2004 | Arndt |
| 6,769,017 B1 | 7/2004 | Bhat et al. |
| 6,976,137 B2 | 12/2005 | Ouren et al. |
| 7,080,146 B2 | 7/2006 | Bradford et al. |
| 7,234,139 B1 | 6/2007 | Feinberg |
| 7,305,592 B2 | 12/2007 | Neiger et al. |
| 7,337,296 B2 | 2/2008 | Noel et al. |
| 7,506,095 B2 | 3/2009 | Otte et al. |
| 7,680,754 B2 | 3/2010 | Hillier |
| 7,698,531 B2 | 4/2010 | Flemming et al. |
| 7,702,843 B1 | 4/2010 | Chen et al. |
| 7,849,347 B2 | 12/2010 | Armstrong et al. |
| 2002/0010844 A1 | 1/2002 | Noel et al. |

(Continued)

OTHER PUBLICATIONS

Office Action for U.S. Appl. No. 12/403,402 (US Application Publication No. 2009-0307713 A1) dated Nov. 30, 2011.

(Continued)

*Primary Examiner* — Sanjiv Shah
*Assistant Examiner* — Daniel Tsui
(74) *Attorney, Agent, or Firm* — Heslin Rothenberg Farley & Mesiti, P.C.

(57) ABSTRACT

Transparent hypervisor pinning of critical memory areas is provided for a shared memory partition data processing system. The transparent hypervisor pinning includes receiving at a hypervisor a hypervisor call initiated by a logical partition to register a logical memory area of the logical partition with the hypervisor. Responsive to this hypervisor call, the hypervisor transparently determines whether the logical memory is a critical memory area for access by the hypervisor. If the logical memory area is a critical memory area, then the hypervisor automatically pins the logical memory area to physical memory of the shared memory partition data processing system, thereby ensuring that the memory area will not be paged-out from physical memory to external storage, and thus ensuring availability of the logic memory area to the hypervisor.

20 Claims, 7 Drawing Sheets

U.S. PATENT DOCUMENTS

| | | | |
|---|---|---|---|
| 2002/0016812 A1 | 2/2002 | Uchishiba et al. |
| 2002/0087611 A1 | 7/2002 | Tanaka et al. |
| 2002/0138704 A1 | 9/2002 | Hiser et al. |
| 2003/0084372 A1 | 5/2003 | Mock et al. |
| 2004/0139287 A1 | 7/2004 | Foster et al. |
| 2004/0193861 A1 | 9/2004 | Michaelis |
| 2004/0199599 A1 | 10/2004 | Nichols et al. |
| 2005/0071446 A1 | 3/2005 | Graham et al. |
| 2005/0132249 A1 | 6/2005 | Burton et al. |
| 2005/0160151 A1 | 7/2005 | Rawson, III |
| 2005/0240932 A1 | 10/2005 | Billau et al. |
| 2005/0278719 A1 | 12/2005 | Togawa |
| 2006/0075207 A1 | 4/2006 | Togawa et al. |
| 2006/0101224 A1 | 5/2006 | Shah et al. |
| 2006/0123217 A1 | 6/2006 | Burdick et al. |
| 2006/0146057 A1 | 7/2006 | Blythe |
| 2006/0195673 A1 | 8/2006 | Arndt et al. |
| 2006/0236059 A1 | 10/2006 | Fleming et al. |
| 2007/0061441 A1 | 3/2007 | Landis et al. |
| 2007/0112999 A1 | 5/2007 | Oney et al. |
| 2007/0210650 A1 | 9/2007 | Togashi |
| 2007/0299990 A1 | 12/2007 | Ben-Yehuda et al. |
| 2008/0040565 A1 | 2/2008 | Rozas et al. |
| 2008/0071755 A1 | 3/2008 | Barsness et al. |
| 2008/0082696 A1 | 4/2008 | Bestler |
| 2008/0082975 A1 | 4/2008 | Oney et al. |
| 2008/0183996 A1 | 7/2008 | Field et al. |
| 2008/0256321 A1 | 10/2008 | Armstrong et al. |
| 2008/0256327 A1 | 10/2008 | Jacobs et al. |
| 2008/0256530 A1 | 10/2008 | Armstrong et al. |
| 2009/0100237 A1 | 4/2009 | Orikasa et al. |
| 2009/0144510 A1 | 6/2009 | Wibling et al. |
| 2009/0307436 A1 | 12/2009 | Larson et al. |
| 2009/0307438 A1 | 12/2009 | Logan et al. |
| 2009/0307439 A1 | 12/2009 | Jacobs et al. |
| 2009/0307440 A1 | 12/2009 | Jacobs et al. |
| 2009/0307441 A1 | 12/2009 | Hepkin et al. |
| 2009/0307445 A1 | 12/2009 | Jacobs et al. |
| 2009/0307447 A1 | 12/2009 | Jacobs et al. |
| 2009/0307688 A1 | 12/2009 | Pafumi et al. |
| 2009/0307690 A1 | 12/2009 | Logan et al. |
| 2009/0307713 A1 | 12/2009 | Anderson et al. |
| 2010/0079302 A1 | 4/2010 | Eide et al. |
| 2010/0083252 A1 | 4/2010 | Eide et al. |

OTHER PUBLICATIONS

IBM International Technical Support Organization, "HiperSockets Implementation Guide", pp. 1-132 (Mar. 2007).

Valdez, E. et al., "Retrofitting the IBM Power Hypervisor to Support Mandatory Access Control", 23rd Annual Computer Security Applications Conference (pp. 221-230) (2007).

Notice of Allowance for U.S. Appl. No. 12/403,408 (US Application Publication No. 2009-0307436 A1) dated Dec. 19, 2011.

Office Action for U.S. Appl. No. 12/403,408 (US Application Publication No. 2009-0307436 A1) dated Jul. 15, 2011.

Notice of Allowance for U.S. Appl. No. 12/403,426 (US Application Publication No. 2009-0307438 A1) Nov. 7, 2011.

Office Action for U.S. Appl. No. 12/403,426 (US Application Publication No. 2009-0307438 A1) dated May 26, 2011.

Office Action for U.S. Appl. No. 12/403,440 (US Application Publication No. 2009-0307439 A1) dated Oct. 27, 2011.

Notice of Allowance for U.S. Appl. No. 12/403,447 (US Application Publication No. 2009-0307440 A1) dated Oct. 18, 2011.

Office Action for U.S. Appl. No. 12/403,447 (US Application Publication No. 2009-0307440 A1) dated May 11, 2011.

Office Action for U.S. Appl. No. 12/403,472 (US Application Publication No. 2009-0307441 A1) dated Sep. 22, 2011.

Kloster, Jacob Faber et al. "Efficient Memory Sharing in the Xen Virtual Machine Monitor", Department of Computer Science, Aalborg University (Jan. 2006).

Waldspurger, Carl A., "Memory Resource Management in VMware ESX Server." ACM, OSDI '02, (Dec. 2002).

Office Action for U.S. Appl. No. 12/403,485 (US Application Publication No. 2009-0307447 A1) dated Apr. 28, 2011.

Office Action for U.S. Appl. No. 12/403,485 (US Application Publication No. 2009-0307447 A1) dated Oct. 7, 2011.

Office Action for U.S. Appl. No. 12/478,990 (US Application Publication No. 2009-0307538 A1) dated Jan. 19, 2011.

Jacobs et al., Office Action for U.S. Appl. No. 12/403,459, filed Mar. 13, 2009 (US Patent Publication No. 2009/0307445 A1), dated Mar. 7, 2012.

Logan et al., Office Action for U.S. Appl. No. 13/369,575, filed Feb. 9, 2012, dated Mar. 12, 2012.

Jacobs et al., Office Action for U.S. Appl. No. 13/344,721, filed Jan. 6, 2012, dated Mar. 20, 2012.

Logan et al., Office Action for U.S. Appl. No. 12/403,416, filed Mar. 13, 2009 (US Patent Publication No. 2009/0307690 A1), dated Mar. 30, 2012.

Jacobs et al., Final Office Action for U.S. Appl. No. 12/403,440, filed Mar. 13, 2009 (US Patent Publication No. 2009/0307439 A1) dated Apr. 6, 2012.

Larson et al., Office Action for U.S. Appl. No. 13/362,402, filed Jan. 31, 2012, dated Apr. 11, 2012.

Logan et al., Office Action dated Jul. 16, 2012, for U.S. Appl. No. 13/447,393, which was filed Apr. 16, 2012.

TRANSPARENT HYPERVISOR PINNING OF CRITICAL MEMORY AREAS IN A SHARED MEMORY PARTITION DATA PROCESSING SYSTEM

CROSS-REFERENCE TO RELATED APPLICATIONS

This application is a continuation of U.S. patent application Ser. No. 12/403,447, filed Mar. 13, 2009, entitled "Transparent Hypervisor Pinning of Critical Memory Areas in a Shared Memory Partition Data Processing System", which was published on Dec. 10, 2009, as U.S. Patent Publication No. 2009/0307440 A1, and which claims the benefit of U.S. provisional application Ser. No. 61/059,492, filed Jun. 6, 2008, entitled "Virtual Real Memory", the entirety of each of which is incorporated herein by reference.

TECHNICAL FIELD

The present invention relates generally to data processing systems, and more particularly, to transparent pinning of critical memory areas in the hypervisor-managed paging environment of a shared memory partition data processing system.

BACKGROUND OF THE INVENTION

Logical partitions (LPARs) running atop a hypervisor of a data processing system are often used to provide higher-level function than provided by the hypervisor itself. For example, one LPAR may be designated a virtual input/output server (VIOS), which provides input/output (I/O) services to one or more other LPARs of the data processing system. This offloading of higher-level function avoids complex code in the hypervisor, and thus, assists in maintaining the hypervisor small and secure within the data processing system.

Currently, the number of logical partitions (LPARs) that may be created on a partitionable server of the data processing system is bound by the amount of real memory available on that server. That is, if the server has 32 GBs of real memory, once the partitions have been created and have been allocated those 32 GBs of real memory, no further logical partitions can be activated on that server. This places restriction on those configurations where a customer may wish to have, for example, hundreds of logical partitions on one partitionable server.

Partitioned computing platforms have led to challenges to fully utilize available resources in the partitioned server. These resources, such as processor, memory and I/O, are typically assigned to a given partition and are therefore unavailable to other partitions on the same platform. Flexibility may be added by allowing the user to dynamically remove and add resources, however, this requires active user interaction, and can therefore be cumbersome and inconvenient. Also, memory is difficult to fully utilize in this way since there are frequently large amounts of infrequently accessed memory in idle partitions. However, that memory needs to be available to the operating system(s) to handle sudden spikes in workload requirements.

SUMMARY OF THE INVENTION

To address this need, the concept of a shared memory partition has been created. A shared memory partition's memory is backed by a pool of physical memory in the server that is shared by other shared memory partitions on that server. The amount of physical memory in the pool will typically be smaller than the sum of the logical memory assigned to all of the shared memory partitions in the pool to allow the memory to be more fully utilized. Idle and/or less active logical memory in the shared partitions that does not fit in the physical memory pool is paged-out by the hypervisor to a cheaper and more abundant form of external storage via an entity external to the hypervisor known as a paging service partition.

In a partitioned computing environment, the operating systems running in the partitions register areas of memory with the hypervisor when they are started. Some of these areas of memory include control blocks or buffers that are used by hypervisor code. Registered areas that are shared with the hypervisor are deemed critical to the interaction between the operating system and the hypervisor. Shared memory partitions introduce new problems related to the registration and use of these areas.

The areas of memory shared between the operating system and the hypervisor must be available to the hypervisor when it needs to access them. The hypervisor code using these areas is not allowed to block, and there is no guarantee that the memory will ever become available. Due to the nature of shared memory partitions, therefore, a approach is needed to ensure that these memory areas are pinned in physical memory to eliminate the possibility of the memory being paged-out to external storage, and not readily available to the hypervisor.

Provided herein, therefore, is a method of pinning a logical memory area to physical memory in a shared memory partition data processing system. The method includes: receiving by a hypervisor of the shared memory partition data processing system a hypervisor call, the hypervisor call being initiated by a logical partition of the shared memory partition data processing system to register a logical memory area with the hypervisor; and responsive to receipt of the hypervisor call, transparently determining by the hypervisor whether the logical memory area to be registered is a critical memory area for access by the hypervisor, and if so, automatically pinning by the hypervisor the logical memory area to the physical memory of the shared memory partition data processing system to ensure availability thereof to the hypervisor by preventing the logical memory area from being paged-out from the physical memory to external storage.

In another aspect, a shared memory partition data processing system is provided. The shared memory partition data processing system comprises at least one logical partition, which is at least one shared memory partition, a physical memory comprising a shared memory pool for the at least one shared memory partition, and a hypervisor interfaced to the physical memory and to the at least one shared memory partition. The hypervisor responds to a hypervisor call from a shared memory partition to register a logical memory area thereof with the hypervisor by transparently determining whether the logical memory area is a critical memory area for access by the hypervisor, and if so, by automatically pinning the logical memory area to the physical memory, thereby ensuring availability thereof to the hypervisor by preventing the logical memory area from being paged-out from the physical memory to external storage.

In a further aspect, the invention comprises an article of manufacture which comprises at least one computer-readable medium having computer-readable program code logic to transparently pin by a hypervisor a logical memory area to physical memory in a shared memory partition data processing system. The computer-readable program code logic when executing on a processor performing: receiving at the hypervisor a hypervisor call initiated by a logical partition to register a logical memory area of the logical partition with the hypervisor; and transparently determining by the hypervisor whether the logical memory area is a critical memory area for access by the hypervisor, and if so, automatically pinning by the hypervisor the logical memory area to physical memory of the shared memory partition data processing system to ensure availability thereof to the hypervisor by preventing the logical memory area from being paged-out from the physical memory to external storage.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
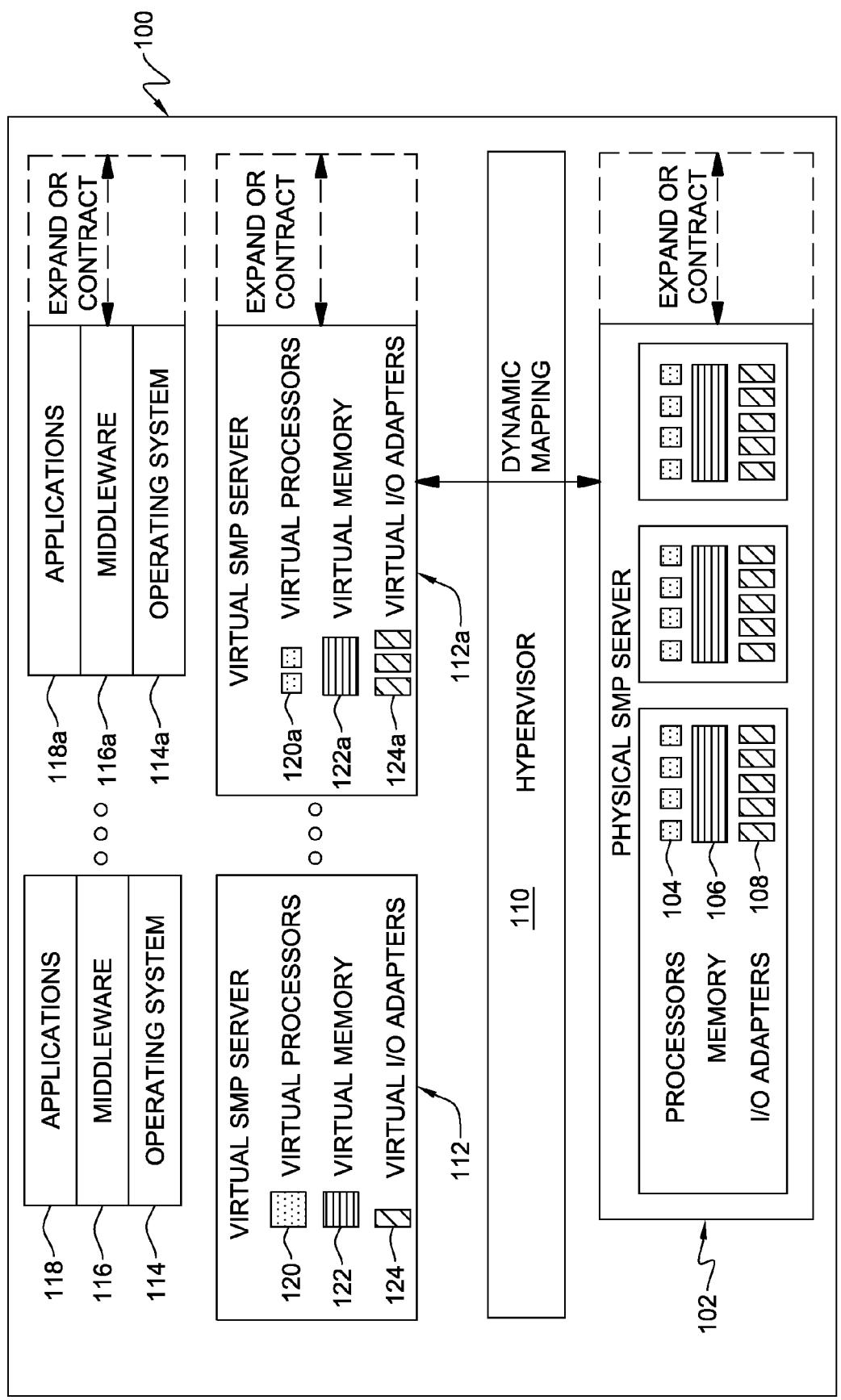
FIG. 1 is a block diagram of one embodiment of a data processing system to implement one or more aspects of the present invention.

FIG. 1 is a block diagram of a data processing system 100, which in one example, is a symmetric multiprocessing (SMP) server computer system. SMP server computer system 100 includes physical hardware devices that can be mapped to, i.e., temporarily owned by, a user application to execute that application.

SMP server computer system 100 includes a physical SMP server 102. Physical SMP server 102 includes physical hardware devices such as processor 104, memory 106, and I/O adapters 108. These physical devices are managed by hypervisor 110. Processors 104 are shared processors and each may be a simultaneous multithreading (SMT)-capable processor that is capable of concurrently executing multiple different threads on the processor.

A virtual server is a proxy for a physical server that has the same capabilities, interfaces, and state. Virtual servers are created and managed by a hypervisor that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
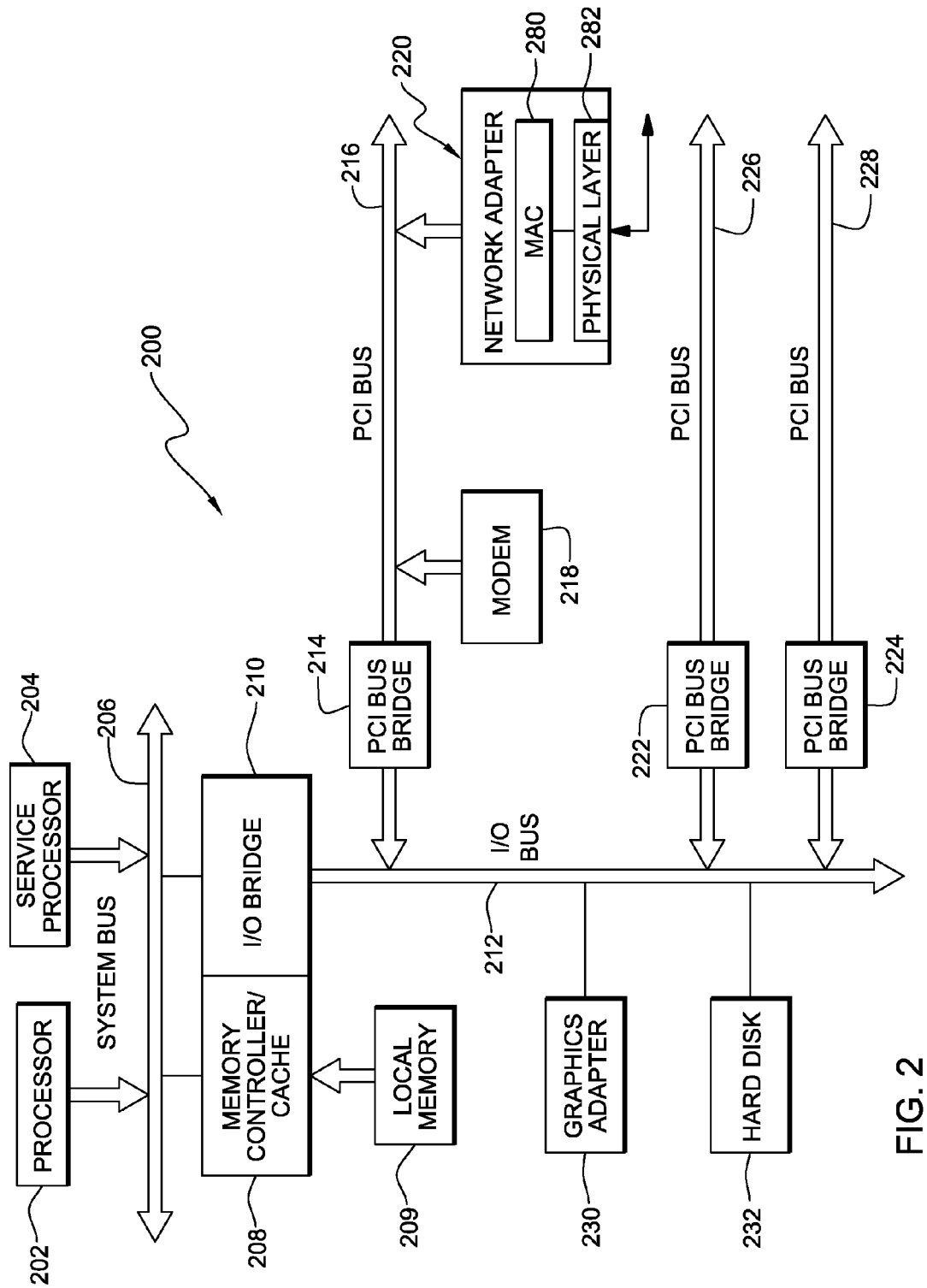
FIG. 2 is a more detailed illustration of a data processing system which could be used to implement one or more aspects of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. Alternatively, a single processor system may be employed. In the depicted example, processor 204 is a service processor. Each SMT-capable processor is capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 1 or 2. As a specific, commercially available example, a shared memory partition data processing system implementing hypervisor-managed paging such as described hereinbelow can be built upon technologies found in IBM's p/i Series product line firmware and systemware, as described in the "Power Architecture Platform Reference" (PAPR) material at Power.org (http://www.power.org/members/developers/specs/PAPR_Version_2.7_09Oct07.pdf), which is hereby incorporated herein by reference. In addition, a virtual input/output server (VIOS) is commercially available as part of a PowerVM computing system offered by International Business Machines Corporation. The VIOS allows sharing of physical resources between logical partitions, including virtual SCSI and virtual networking. This allows more efficient utilization of physical resources through sharing between logical partitions and facilitates server consolidation. (IBM, pSeries, iSeries and PowerVM are registered trademarks of International Business Machines Corporation, Armonk, N.Y., U.S.A. Other names used herein may be registered trademarks, trademarks, or product names of International Business Machines Corporation or other companies.).

Figure 3:
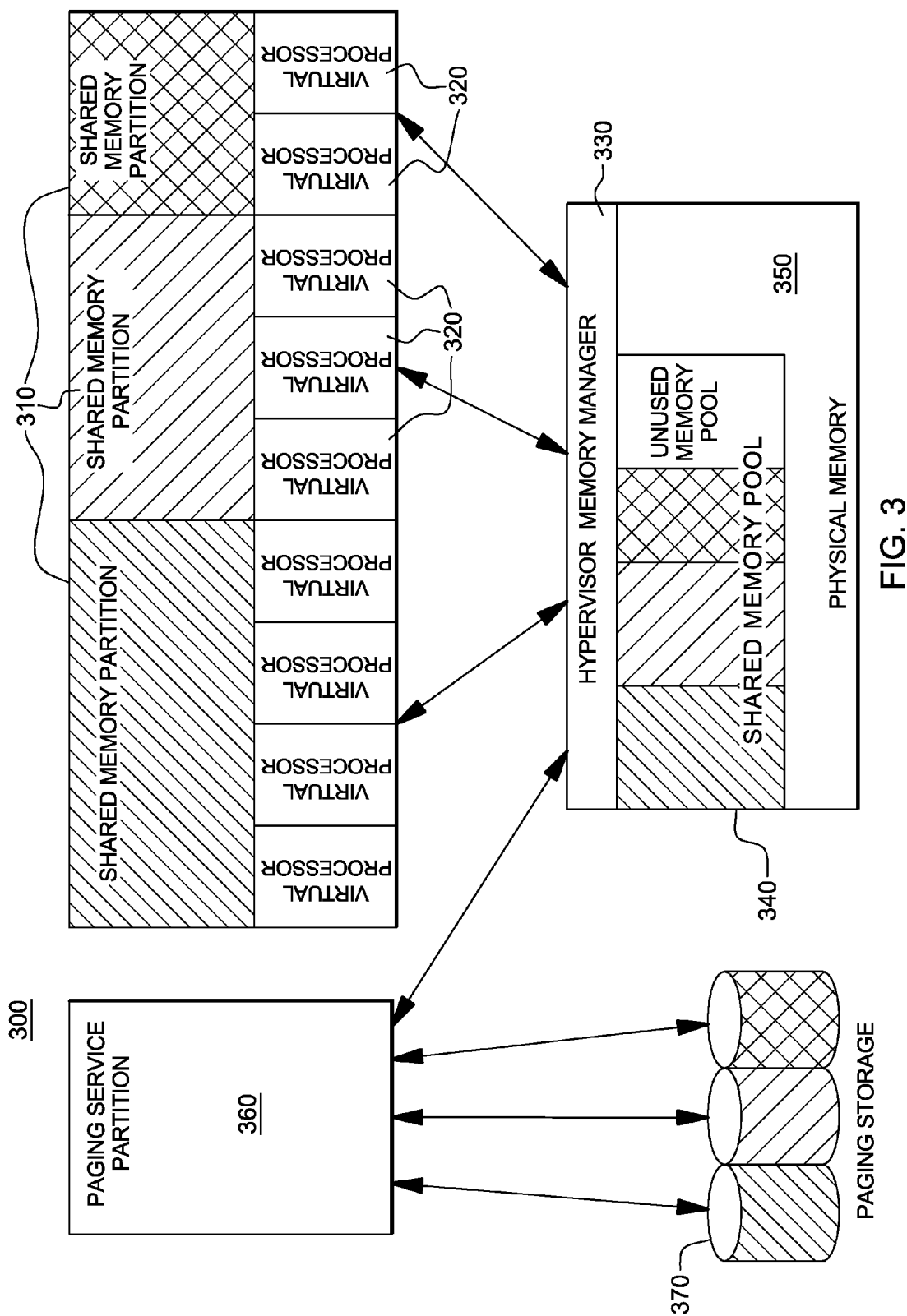
FIG. 3 illustrates one embodiment of a data processing system comprising multiple shared memory partitions employing a common (or shared) memory pool within physical memory of the data processing system, in accordance with an aspect of the present invention.

As noted, partition computing platforms have presented challenges to fully utilize available resources in the partitioned server. One approach to achieving this goal has been the creation of a shared memory partition data processing system, generally denoted 300, such as depicted in FIG. 3. As illustrated, the shared memory partition data processing system 300 includes one or more shared memory logical partitions (referred to herein as shared memory partitions) 310, each of which comprises one or more virtual processors 320, which interface through a hypervisor, and more particularly, a hypervisor memory manager 330, to a shared memory pool 340 within physical memory 350 of the shared memory partition data processing system 300. The amount of physical memory in the pool is typically smaller than the sum of the logical memory assigned to all of the shared memory partitions 310 utilizing the shared memory pool to allow the memory to be more fully employed. Idle and/or less active logical memory of one or more shared memory partitions that does not fit in the shared memory pool 340 is paged-out by the hypervisor to a more abundant, less expensive storage (such as disk storage), via a paging service partition 360. Paging service partition 360 is an enhanced virtual input/output service (VIOS) partition configured to facilitate paging-out and paging-in of memory pages from or to, respectively, the shared memory pool. Also, although referred to as a shared memory partition, in reality, there is no sharing of memory per se between partitions, but rather a sharing of the amount of physical memory in the pool.

Figure 4:
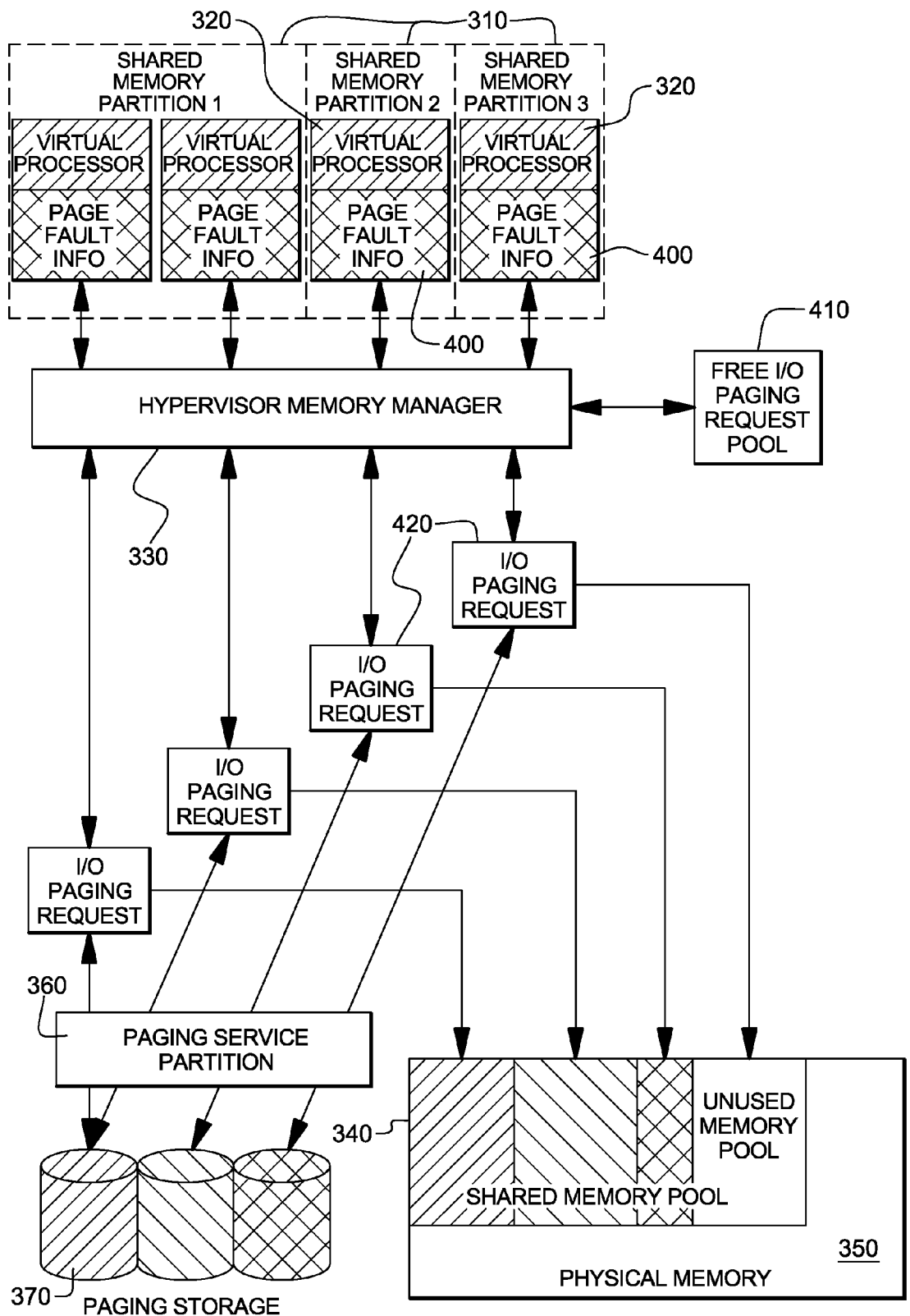
FIG. 4 illustrates one operational embodiment of handling hypervisor page faults within a shared memory partition data processing system, such as depicted in FIG. 3, in accordance with an aspect of the present invention.

FIG. 4 illustrates one operational embodiment of handling hypervisor page faults within a shared memory partition data processing system such as described above in connection with FIG. 3. In this embodiment, three shared memory partitions 310, i.e., shared memory partition 1, shared memory partition 2 & shared memory partition 3, are illustrated, each comprising one or more virtual processors 320, and each encountering a hypervisor page fault 400. Each hypervisor page fault is responsive to a request by a virtual processor 320 for memory that is not resident in the shared memory pool 340 of physical memory 350. Responsive to this, the hypervisor memory manager 330 takes an I/O paging request 420 from a free I/O paging request pool 410 and sends, via the paging service partition 360, the I/O paging request to the external storage entity 370 to request the needed page. Concurrent with requesting the needed page, the partition's virtual processor encountering the hypervisor page fault is placed into a wait state.

As noted above, the logical partitions (or operating systems running in the partitions) register logical memory areas with the hypervisor when they are started. Some of these areas include control blocks or buffers that are used by hypervisor code. The registered areas that are shared with the hypervisor are deemed critical to the interaction or communication between the logical partition and the hypervisor. Shared memory partitions introduce new problems related to the registration and use of these critical memory areas.

The areas of memory shared between the logical partition and the hypervisor must be available to the hypervisor when it needs to access them. That is, the hypervisor code using these areas is not allowed to block, and there is no guarantee that the memory will ever become available. Due to the nature of shared memory partitions, it is therefore desirable to ensure that these critical memory areas be pinned in the physical memory associated with the hypervisor to eliminate the possibility of the memory being paged-out, and therefore not available when needed.

Eliminating the possibility of critical memory being paged-out, and not thus available, prevents a multitude of problems which could occur if the hypervisor code were to fault on one of the critical pages. If the hypervisor were to fault, the fault would impact the performance of other partitions of the system, since the hypervisor would not be available to handle the other partitions' requests while the page fault is being satisfied. This also prevents a deadlock scenario where the hypervisor code faults on one of the critical pages, and the paging service partition needs to perform an input/output (I/O) recovery to get the paging device functional and satisfy the paging request. The I/O recovery is dependent on the higher-level hypervisor, which would be faulted on the critical page, and therefore, the I/O recovery would not occur and the paging service partition would never be able to handle the page fault. Further, the solution presented herein avoids possible freezing of the hypervisor should the paging service partition become non-responsive (e.g., because it crashed), which would otherwise cause the hypervisor to wait indefinitely if it were to fault on a critical memory area required from external storage.

One solution to the problem would be to require that critical memory areas for the hypervisor be defined in the system architecture. In such a case, the logical partition (i.e., operating system) would need to be aware of the critical memory areas and explicitly request that they be pinned prior to registering a critical memory area with the hypervisor. With such a solution, however, each operating system that runs on the hypervisor would need to track critical hypervisor memory areas.

Advantageously, the solution presented herein eliminates the need for the operating system (or logical partition) to be aware of which areas are critical to the hypervisor. As the logical partition registers logical memory areas with the hypervisor, the hypervisor transparently determines which areas are critical memory areas. These memory areas are then pinned by the hypervisor automatically to ensure that they are always resident in physical memory. By pinning critical memory areas to the physical memory, the hypervisor is guaranteed not to fault on these memory areas. Also, as discussed further below, this pinning does not mean that the critical memory area will remain in the same physical memory location.

Figure 5:
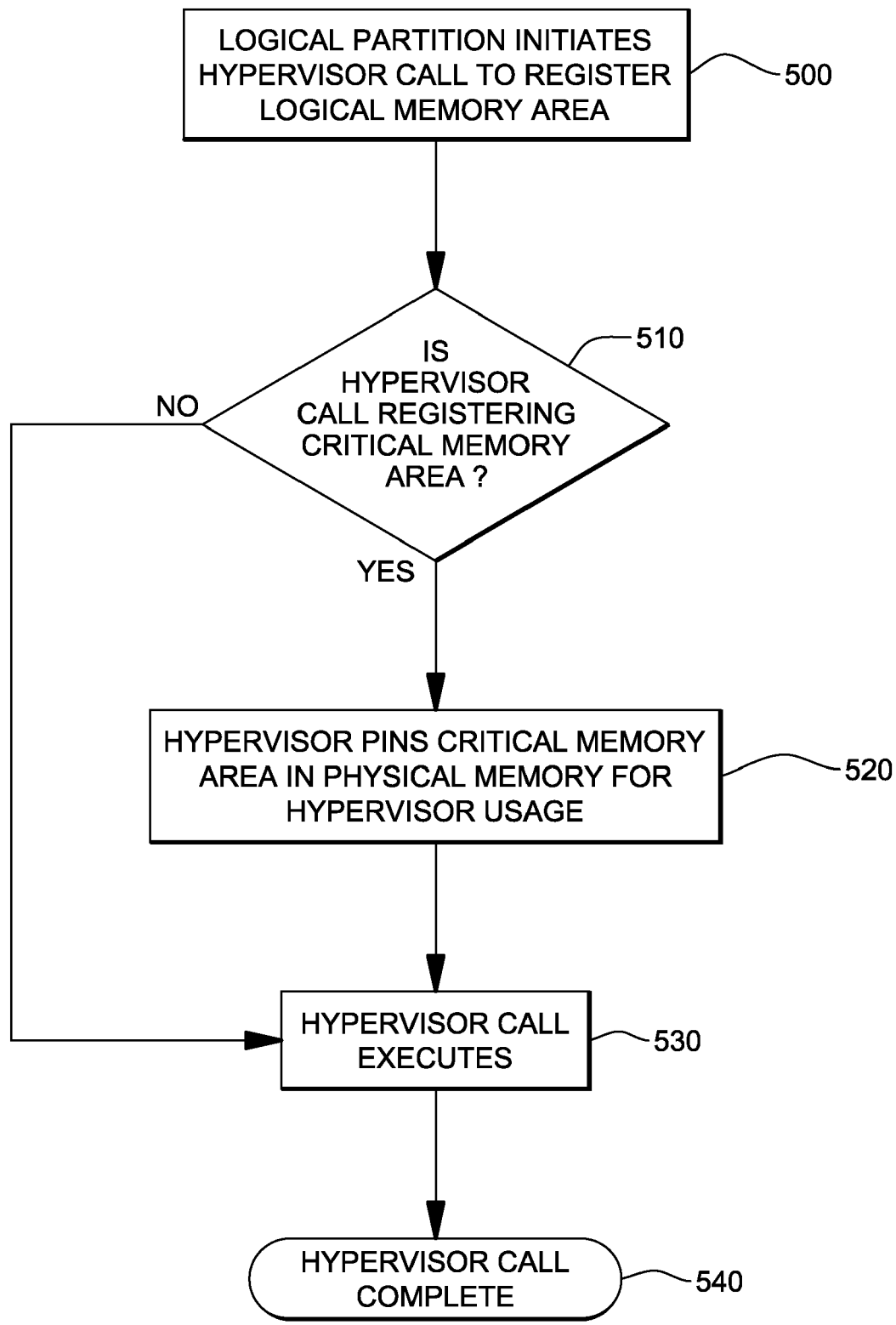
FIG. 5 depicts one embodiment of logic for transparently identifying and pinning critical memory areas of a logical partition to physical memory in a hypervisor-managed paging environment of a shared memory partition data processing system, in accordance with an aspect of the present invention.

Generally stated, therefore, provided herein is an approach for pinning a logical memory area to physical memory in a shared memory partition data processing system. As illustrated in FIG. 5, the approach includes initiating by a logical partition of the shared memory partition data processing system a hypervisor call to register a logical memory area with the hypervisor 500. Responsive to receipt of the hypervisor call, the hypervisor transparently determines whether the logical memory area to be registered is a critical memory area for access by the hypervisor 510. If "no", then the hypervisor executes the hypervisor call to register the logical memory area 530, which completes the hypervisor call 540.

If, however, the hypervisor call is a request to register a logical memory area which is a critical memory area to the hypervisor, then the hypervisor automatically pins the logical memory area to physical memory of the shared memory partition data processing system to ensure availability thereof to the hypervisor by preventing the logical memory area from being paged-out from the physical memory to external storage 520. After pinning the logical memory area to physical memory, the hypervisor executes the hypervisor call to register the logical memory area 530, which completes the processing 540.

In one embodiment, the transparent determination by the hypervisor whether the logical memory area is a critical memory area for access by the hypervisor can be accomplished through the design and implementation of the hypervisor. For example, each logical partition utilizes a defined set of hypervisor calls. The design and implementation of the hypervisor includes knowledge of which of these hypervisor calls are used in logic flows that cannot tolerate a page fault, which as noted, occurs when the logical memory area needed during the hypervisor call is not resident in physical memory. Any control block data structure used during these hypervisor calls are therefore critical and must be persistently resident in physical memory. During the initialization of the logical partition, and during certain runtime operations such as adding or removing a virtual processor of a logical partition, the logical partition invokes a number of hypervisor calls informing the hypervisor of logical memory areas (e.g., control block data structures) which the logical partition will utilize for communication with the hypervisor. If any of these logical memory areas will later be used in critical logic flows between the hypervisor and the logical partition, where the hypervisor cannot tolerate a page fault, then the hypervisor transparently pins the logical memory area to physical memory so that it is accessible to the hypervisor. Therefore, the logical partition (or operating system) does not need to have knowledge of which logical memory areas must be persistently resident in physical memory. This prevents having to make changes to existing operating system code when the criticalness of the logical memory areas change from update to update of the hypervisor.

Figure 6:
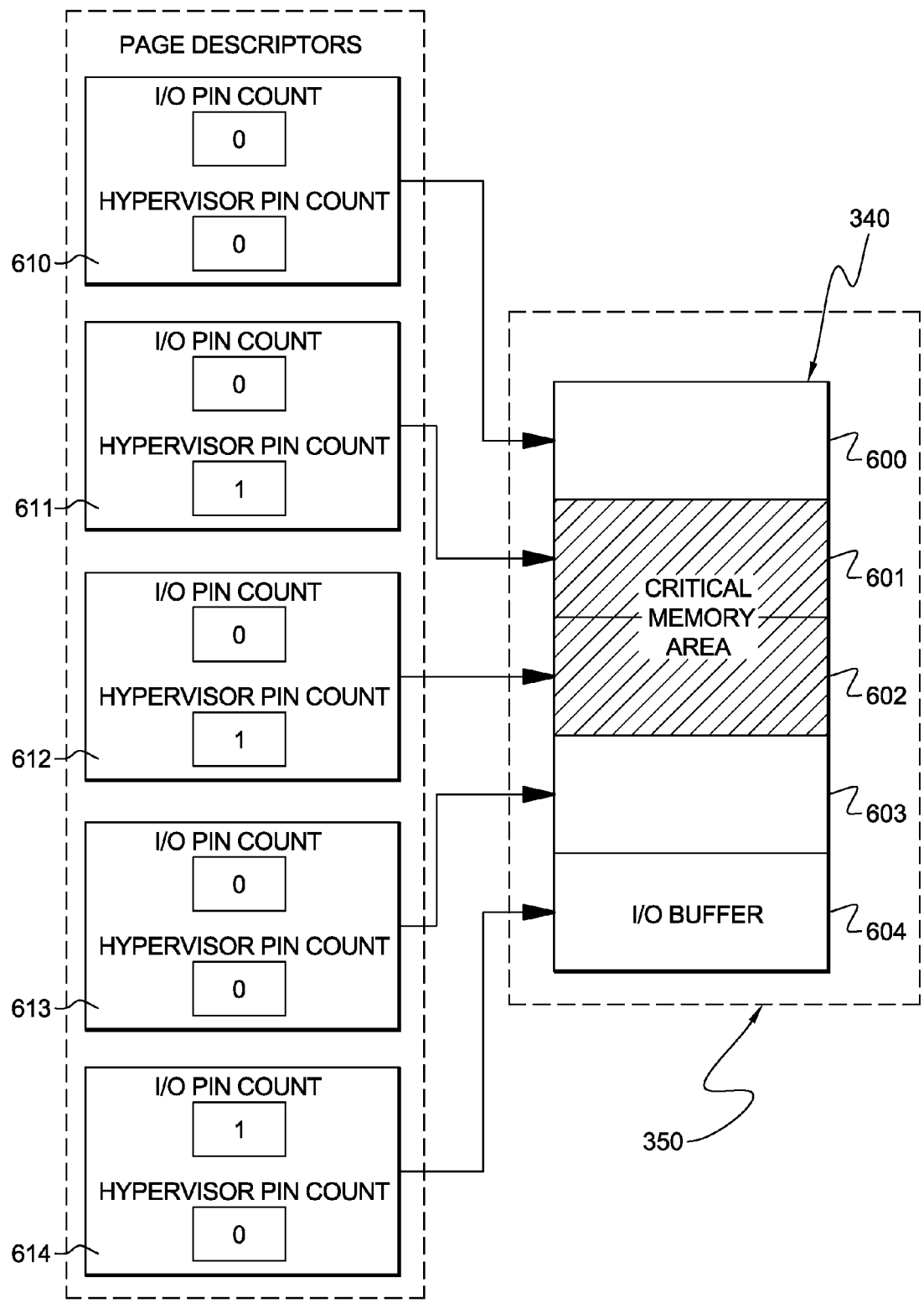
FIG. 6 illustrates one embodiment of a shared memory pool in a shared memory partition data processing system having multiple critical memory areas to be transparently identified, and pinned by a hypervisor using associated memory (or page) descriptors, each comprising a hypervisor pin count for the associated logical memory area, in accordance with an aspect of the present invention.

FIG. 6 illustrates one embodiment of data structures to facilitate the transparent pinning of selected logical memory areas to physical memory by the hypervisor, in accordance with an aspect of the present invention. In FIG. 6, physical memory 350 is again illustrated, along with a shared memory pool 340, such as described above in connection with the shared memory partition data processing system of FIGS. 3 & 4. In this embodiment, the shared memory pool 340 includes a plurality of shared memory areas 600, 601, 602, 603 & 604, each of which may comprise (in on embodiment) one or more logical pages. In the example depicted, logical memory areas 601 & 602 are labeled critical memory areas, as determined by the hypervisor, while logical memory area 604 comprises an input/output (I/O) memory buffer area specified (for example) by the logical partition.

As illustrated in FIG. 6, the hypervisor associates memory descriptors (e.g., page descriptors) with each logical memory area in the shared memory pool of physical memory. In the embodiment depicted, these memory descriptors comprise multiple pinning counts (i.e., pin counts) which track the number of times the associated logical memory area is pinned by either the hypervisor or the logical partition owning the logical memory area. In the embodiment illustrated, each memory descriptor 610, 611, 612, 613 & 614 includes an input/output (I/O) pin count and a hypervisor pin count. The I/O pin count may be controlled by the logical partition as pages are mapped, for example, for direct memory access, input/output, etc. In contrast, the hypervisor pin count is controlled only by the hypervisor. Thus, in the illustrated example, the automatic pinning by the hypervisor includes setting by the hypervisor the hypervisor pin counts in memory descriptors 611, 612 for the associated logical memory areas 601, 602, which as noted above were deemed critical memory areas. The set hypervisor pin count directs that the associated logical memory area be pinned to the physical memory, that is, be designated for persistent storage within the physical memory. The memory descriptors associated with the logical memory areas 600 & 603 do not have their hypervisor pin count set, and thus, are able to be paged-out to external storage as needed.

Because the transparent pinning approach described herein is performed by the hypervisor, the hypervisor is aware of which logical memory areas in the shared memory pool are considered critical memory areas. This knowledge can be employed with other features of the hypervisor, such as partition mobility or memory defragmentation. Since the hypervisor is aware of where the critical memory areas are in the shared memory pool, the hypervisor can relocate the critical memory areas, for example, either within the shared memory pool, or via partition mobility or memory defragmentation, if needed, without unpinning the critical memory areas from the physical memory. This is contrasted with the standard solution of relocating logical memory areas on the fly by paging the logical memory areas out to external storage, and letting the logical memory areas naturally page back into the physical memory at a new location when accessed by the logical partition. This solution would not work in the present case, since the critical memory areas are pinned initially by the hypervisor to the physical memory.

To summarize, transparent hypervisor pinning of selected logical memory areas to physical memory advantageously avoids having to add code to the logical partitions (i.e., operating systems) of a shared memory partition data processing system to enable the logical partitions to be aware of and manage the pinning of these logical memory areas. The solution presented herein moves the management of critical memory areas to the hypervisor, which isolates the management of the logical memory areas in the same place as the enforcement of the pinning of those areas to the physical memory.

Further details on shared memory partition data processing systems are provided in the following, co-filed patent applications, the entirety of each of which is hereby incorporated herein by reference: "Hypervisor-Based Facility for Communicating Between a Hardware Management Console and a Logical Partition", U.S. Ser. No. 12/403,402; "Hypervisor Page Fault Processing in a Shared Memory Partition Data Processing System", U.S. Ser. No. 12/403,408; "Managing Assignment of Partition Services to Virtual Input/Output Adapters", U.S. Ser. No. 12/403,416; "Automated Paging Device Management in a Shared Memory Partition Data Processing System", U.S. Ser. No. 12/403,426; "Dynamic Control of Partition Memory Affinity in a Shared Memory Partition Data Processing System", U.S. Ser. No. 12/403,440; "Shared Memory Partition Data Processing System with Hypervisor Managed Paging", U.S. Ser. No. 12/403,459; "Controlled Shut-Down of Partitions Within a Shared Memory Partition Data Processing System", U.S. Ser. No. 12/403,472; and "Managing Migration of a Shared Memory Logical Partition From a Source System to a Target System", U.S. Ser. No. 12/403,485.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 7:
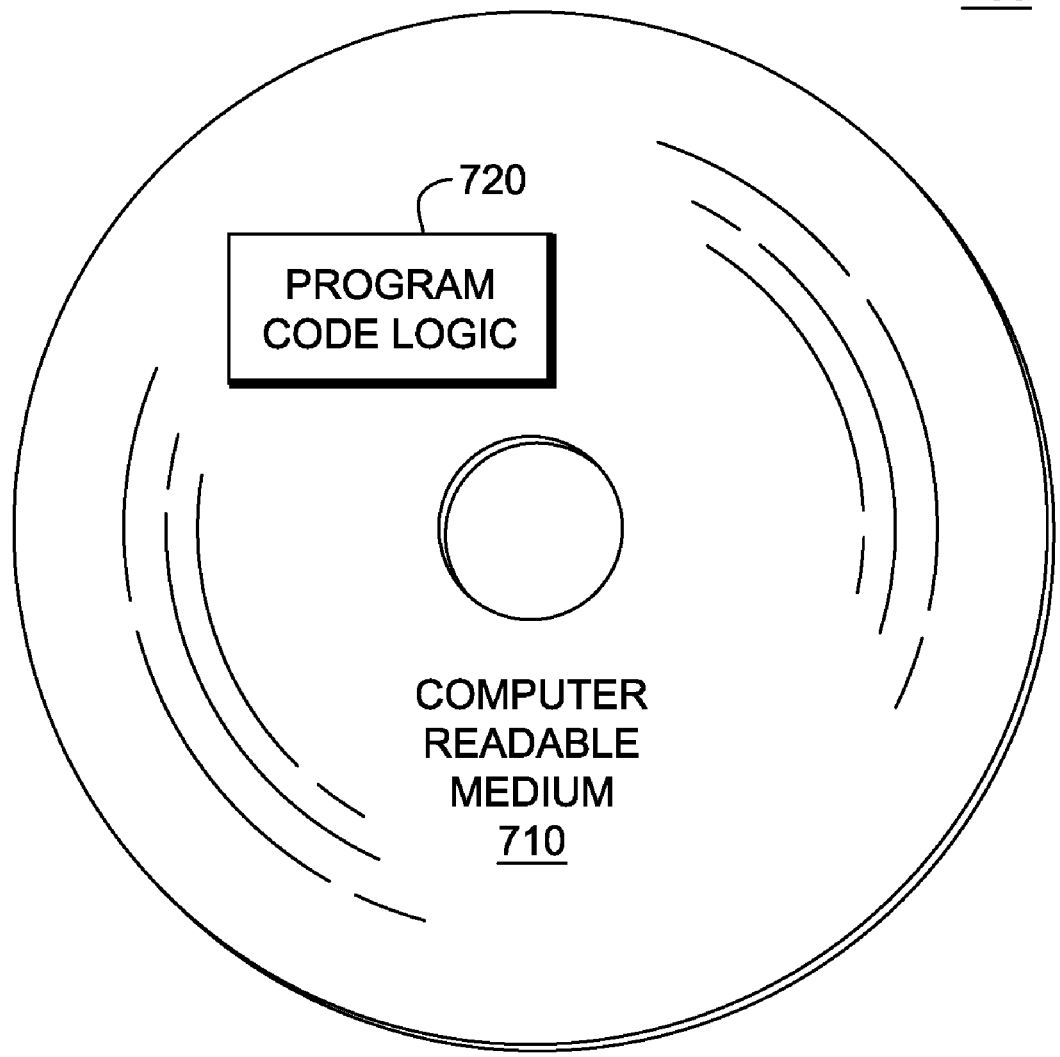
FIG. 7 depicts one embodiment of a computer program product incorporating one or more aspects of the present invention.

One example of an article of manufacture or a computer program product incorporating one or more aspects of the present invention is described with reference to FIG. 7. A computer program product 700 includes, for instance, one or more computer usable media 710 to store computer readable program code means or logic 720 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although various embodiments are described above, these are only examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of pinning a logical memory area to physical memory in a shared memory partition data processing system, the method comprising:
   receiving by a hypervisor of the shared memory partition data processing system a request to register a logical memory area with the hypervisor; and
   responsive to receipt of the request, transparently determining by the hypervisor whether the logical memory area is a critical memory area for access by the hypervisor, and if so, automatically pinning by the hypervisor the logical memory area to physical memory of the shared memory partition data processing system to ensure availability thereof to the hypervisor by preventing the logical memory area from being paged-out from the physical memory to external storage.

2. The method of claim 1, wherein the automatic pinning comprises setting by the hypervisor a hypervisor pin count associated by the hypervisor with the logical memory area, wherein the hypervisor pin count when set prevents the logical memory area from being paged-out to external storage, thereby pinning the logical memory area to physical memory.

3. The method of claim 2, further comprising associating by the hypervisor a memory descriptor with the logical memory area, the memory descriptor comprising the hypervisor pin count, and wherein the hypervisor pin count is controlled by the hypervisor only.

4. The method of claim 1, further comprising receiving by the hypervisor multiple requests to register multiple logical memory areas with the hypervisor, and wherein the transparently determining comprises transparently determining by the hypervisor to automatically pin at least one logical memory area of the multiple logical memory areas to physical memory, and to leave unpinned at least one other logical memory area of the multiple logical memory areas, wherein the unpinned at least one other logical memory area can be paged-out from the physical memory to external storage.

5. The method of claim 1, wherein the critical memory area for access by the hypervisor is a logical memory area for which the hypervisor by design cannot tolerate a hypervisor page fault, and wherein the logical memory area comprises at least one logical page, and a hypervisor page fault means that a needed logical page is absent from the physical memory, having been stored to external storage separate from the physical memory of the shared memory partition data processing system.

6. The method of claim 1, wherein the logical memory area comprises a control block data structure, and wherein the transparently determining comprises transparently determining by the hypervisor whether the control block data structure is a critical control block data structure for hypervisor communication with the logical partition, and if so, automatically pinning by the hypervisor the critical control block data structure to physical memory.

7. The method of claim 1, wherein the transparently determining and the automatically pinning occur without knowledge of a logical partition initiating the request, and wherein the method further comprises allowing the hypervisor to relocate the logical memory area in physical memory after pinning thereof and without unpinning the logical memory area to the physical memory.

8. The method of claim 1, wherein one or more shared memory partitions of the shared memory partition data processing system share a shared memory pool in the physical memory of the shared memory partition data processing system, and wherein logical memory assigned to the one or more shared memory partitions is greater than physical memory assigned to the shared memory pool, and logical memory may be paged-out from the shared memory pool to the external storage, and wherein the request is initiated by a logical partition comprising one shared memory partition of the one or more shared memory partitions sharing the shared memory pool.

9. A shared memory partition data processing system comprising:
   at least one logical partition, the at least one logical partition being at least one shared memory partition;
   a physical memory comprising a shared memory pool for the at least one shared memory partition of the data processing system; and
   a hypervisor interfaced to the physical memory and to the at least one shared memory partition, wherein the hypervisor responds to a request to register a logical memory area with the hypervisor by transparently determining whether the logical memory area is a critical memory area for access by the hypervisor, and if so, by automatically pinning the logical memory area to the physical memory, thereby ensuring availability thereof to the hypervisor by preventing the logical memory area from being paged-out from the physical memory to external storage.

10. The shared memory partition data processing system of claim 9, wherein the automatic pinning by the hypervisor comprises setting by the hypervisor a hypervisor pin count associated with the logical memory area, wherein the hypervisor pin count when set prevents the logical memory area from being paged-out to external storage, thereby pinning the logical memory area to physical memory.

11. The shared memory partition data processing system of claim 10, wherein the hypervisor associates a memory descriptor with the logical memory area, the memory descriptor comprising the hypervisor pin count, and wherein the hypervisor pin count is transparent to the logical partition, and is controlled by the hypervisor only.

12. The shared memory partition data processing system of claim 9, wherein the hypervisor receives multiple requests to register multiple logical memory areas with the hypervisor, and wherein the transparently determining comprises transparently determining by the hypervisor to automatically pin at least one logical memory area of the multiple logical memory areas to physical memory, and to leave unpinned at least one other logical memory area of the multiple logical memory areas, wherein the unpinned at least one other logical memory area can be paged-out from the physical memory to external storage.

13. The shared memory partition data processing system of claim 9, wherein the critical memory area for access by the hypervisor is a logical memory area for which the hypervisor by design cannot tolerate a hypervisor page fault, and wherein the logical memory area comprises at least one logical page, and a hypervisor page fault means that a needed logical page is absent from the physical memory, having been stored to external storage separate from the physical memory of the shared memory partition data processing system.

14. The shared memory partition data processing system of claim 9, wherein the logical memory area comprises a control block data structure, and wherein the transparently determining by the hypervisor comprises transparently determining by the hypervisor when the control block data structure is a critical control block data structure for hypervisor communication with the at least one shared memory partition, and if so, automatically pinning by the hypervisor the critical control block data structure to physical memory.

15. The shared memory partition data processing system of claim 9, wherein the transparently determining and the automatically pinning by the hypervisor occur without knowledge of the at least one shared memory partition, and wherein the hypervisor is allowed to relocate the pinned logical memory area in physical memory without unpinning the logical memory area to the physical memory.

16. An article of manufacture comprising:
at least one non-transitory computer-readable medium having computer-readable program code logic to transparently pin by a hypervisor a logical memory area to physical memory in a shared memory partition data processing system, the computer-readable program code logic when executing on a processor performing:
receiving at the hypervisor a request to register a logical memory area of the logical partition with the hypervisor; and
transparently determining by the hypervisor whether the logical memory area is a critical memory area for access by the hypervisor, and if so, automatically pinning by the hypervisor the logical memory area to physical memory of the shared memory partition data processing system to ensure availability thereof to the hypervisor by preventing the logical memory area from being paged-out from the physical memory to external storage.

17. The article of manufacture of claim 16, wherein the automatically pinning comprises automatically setting by the hypervisor a hypervisor pin count associated by the hypervisor with the logical memory area, wherein the hypervisor pin count when set prevents the logical memory area from being paged-out to external storage, thereby pinning the logical memory area to physical memory.

18. The article of manufacture of claim 17, further comprising associating by the hypervisor a memory descriptor with the logical memory area, the memory descriptor comprising the hypervisor pin count, and wherein the hypervisor pin count is controlled by the hypervisor only.

19. The article of manufacture of claim 16, wherein the computer-readable program code logic when executing on a processor further performs receiving by the hypervisor multiple requests to register multiple logical memory areas with the hypervisor, and wherein the transparently determining comprises transparently determining by the hypervisor to automatically pin at least one logical memory area of the multiple logical memory areas to physical memory, and to leave unpinned at least one other logical memory area of the multiple logical memory areas, wherein the unpinned at least one other logical memory area can be paged-out from the physical memory to external storage.

20. The article of manufacture of claim 16, wherein the critical memory area for access by the hypervisor is a logical memory area for which the hypervisor by design cannot tolerate a hypervisor page fault, and wherein the logical memory area comprises at least one logical page, and a hypervisor page fault means that a needed logical page is absent from the physical memory, having been stored to external storage separate from the physical memory of the shared memory partition data processing system.

* * * * *